United States Patent
Wu et al.

(10) Patent No.: US 8,499,291 B2
(45) Date of Patent: Jul. 30, 2013

(54) METHOD FOR DYNAMICALLY LINKING PROGRAM ON EMBEDDED PLATFORM AND EMBEDDED PLATFORM

(75) Inventors: Zhihua Wu, Shenzhen (CN); Jia Gu, Shenzhen (CN); Xuan Qiu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 112 days.

(21) Appl. No.: 13/109,384

(22) Filed: May 17, 2011

(65) Prior Publication Data

US 2011/0219363 A1 Sep. 8, 2011

Related U.S. Application Data

(63) Continuation of application No. PCT/CN2009/073324, filed on Aug. 18, 2009.

(30) Foreign Application Priority Data

Nov. 18, 2008 (CN) .......................... 2008 1 0180934

(51) Int. Cl.
*G06F 9/44* (2006.01)

(52) U.S. Cl.
USPC .......................................................... 717/140

(58) Field of Classification Search
None
See application file for complete search history.

(56) References Cited

U.S. PATENT DOCUMENTS

| | | | | |
|---|---|---|---|---|
| 5,640,550 | A * | 6/1997 | Coker ........................... | 717/141 |
| 6,918,103 | B2 * | 7/2005 | Brawn et al. ..................... | 713/2 |
| 7,546,507 | B1 * | 6/2009 | Wright et al. .................. | 714/742 |
| 2002/0133527 | A1 * | 9/2002 | Daynes et al. ................. | 709/100 |
| 2003/0074487 | A1 * | 4/2003 | Akgul et al. ................... | 709/328 |
| 2003/0101334 | A1 * | 5/2003 | Desoli ........................... | 712/227 |
| 2003/0163508 | A1 * | 8/2003 | Goodman ...................... | 709/100 |
| 2003/0204830 | A1 * | 10/2003 | Brawn et al. ..................... | 716/17 |
| 2004/0103073 | A1 * | 5/2004 | Blake et al. ....................... | 707/1 |

(Continued)

FOREIGN PATENT DOCUMENTS

| | | |
|---|---|---|
| CN | 1866202 A | 11/2006 |
| CN | 101131635 A | 2/2008 |

(Continued)

OTHER PUBLICATIONS

"BuildDefaults,h" published 2005. http://www.angryredplanet.com/~hackbod/openbinder/docs/html/BuildDefaults_8h-source.html. 8 pages.*

(Continued)

*Primary Examiner* — Wei Zhen
*Assistant Examiner* — Adam R. Banes
(74) *Attorney, Agent, or Firm* — Ladas & Parry LLP

(57) ABSTRACT

The examples of the present invention disclose a method for dynamically linking a program on an embedded platform and an embedded platform. The embedded platform includes a middle layer which comprises at least one class. An application program to be linked includes at least one class. The application program is compiled into PICs, wherein storage positions of different code sections in the PICs which are obtained by compiling different functions of the application program do not overlap with each other; all the PICs are copied into a memory of the embedded operation system; a class pointer is created, and the class pointer is transferred between the class of the middle layer and the class of the application program to dynamically link the application program.

7 Claims, 2 Drawing Sheets

U.S. PATENT DOCUMENTS

| | | | |
|---|---|---|---|
| 2004/0168028 A1* | 8/2004 | Cierniak ........................ | 711/125 |
| 2005/0010911 A1* | 1/2005 | Kim et al. ...................... | 717/140 |
| 2005/0120122 A1* | 6/2005 | Farnham ........................ | 709/230 |
| 2005/0193137 A1* | 9/2005 | Farnham ........................ | 709/230 |
| 2006/0074931 A1* | 4/2006 | Burka et al. ................... | 707/100 |
| 2006/0112368 A1* | 5/2006 | Gowen et al. .................. | 717/100 |
| 2007/0180509 A1* | 8/2007 | Swartz et al. ..................... | 726/9 |
| 2007/0256087 A1* | 11/2007 | Forin et al. .................... | 719/332 |
| 2008/0052711 A1* | 2/2008 | Forin et al. .................... | 718/100 |
| 2008/0082992 A1* | 4/2008 | Relyea ........................... | 719/331 |
| 2009/0031285 A1* | 1/2009 | Agrawal ........................ | 717/116 |
| 2010/0083223 A1* | 4/2010 | Chouinard et al. ............ | 717/110 |

FOREIGN PATENT DOCUMENTS

| | | |
|---|---|---|
| CN | 101441566 A | 5/2009 |
| EP | 1 521 428 A1 | 4/2005 |
| JP | 01-169533 A | 7/1989 |
| JP | 08-179947 A | 7/1996 |
| JP | 2005-302055 A | 10/2005 |
| JP | 2006-519518 A | 8/2006 |
| WO | 2005/034478 A1 | 4/2005 |
| WO | 2008/041028 A1 | 4/2008 |

OTHER PUBLICATIONS

"Thread: ARM: ADS1.2 and RVCT2.2 environmental variables." Published Nov. 23, 2006. http://www.edaboard.com/thread81152.html. 2 pages.*

International Search Report: mailed Dec. 3, 2009; PCT/CN2009/073324.

Masayoshi Moriya; "Whole Picture of SF Projection in IBM Business Communication", Japan Business Communication Inc. Oct. 1, 1997, vol. 34, No. 10, pp. 18-56 No English version avaliable.

Chinese First Office Action dated Nov. 1, 2010; Appln. No. 200810180934.2.

Indonesian First Office Action; Appln. No. W-00201102202.

Japan First Office Action; Mailed Oct. 9, 2012; Appln. No. 2011-536728.

Mexico First Office Action; Appln. No. MX/A/2011/005232.

Singapore First Office Action; Appln. No. 201103541-7.

Singapore Second Office Action; Appln. No. 201103541-7.

Second Japanese Office Action dated Mar. 8, 2013; Appln. No. 2011-536728.

* cited by examiner

METHOD FOR DYNAMICALLY LINKING PROGRAM ON EMBEDDED PLATFORM AND EMBEDDED PLATFORM

FIELD OF THE INVENTION

The present invention relates to embedded technologies, and more particularly to a method for dynamically linking a program on an embedded platform and an embedded platform.

BACKGROUND OF THE INVENTION

As well known, program link include static link and dynamic link. When the static link is adopted, the address of an application program is determinate in a compile phase. If multiple application programs invoke functions in a function library currently, the number of function libraries needing to be copied into a memory is the same as the number of the application programs, which will waste the space of the memory. In the dynamic link, the functions in the function library are located through an import library. The import library only stores a description of an invoking relation between functions, does not store actual codes, and thus can save the space of the memory.

Currently, in an embedded product such as a mobile telephone, the dynamic link of a program has been implemented by using an Executable and Linking Format (ELF) mode, referring to FIG. 1.

FIG. 1 is a schematic diagram of dynamically linking a program by using an ELF mode in the prior art.

As shown in FIG. 1, when the dynamic link of the program is implemented by using the ELF mode, the application program is compiled into an ELF file firstly, then function relocation and variable relocation are performed for the ELF file by using an ELF LOADER program, afterwards the ELF file for which the relocation has been performed is loaded into an embedded Operation System (OS), and finally the embedded operation system links functions and variables according to the positions of the functions and variables for which the relocation has been performed, so as to implement the dynamic link of the program.

When the dynamic link of the program is implemented by using the ELF mode, the ELF LOADER program plays an important role, which is used to relocate the addresses of functions and variables in the application program with addresses in the embedded operation system. Specifically, the ELF LOADER program extracts available information from the ELF file, calculate the addresses used after the relocation for functions and variables in the ELF file, and then perform relocation for the functions and variables according to the addresses.

As can be seen, when the dynamic link of the program is implemented by using the ELF mode, since it is needed to extract available information from the ELF file and perform processing for the available information, the speed of dynamically linking the program is slow and calculating resources are wasted.

SUMMARY OF THE INVENTION

In view of the above, the present invention provides an embedded platform and a method for dynamically linking a program on the embedded platform, so as to improve the speed of dynamically linking the program.

The technical solutions of the present invention are implemented as follows.

A method of dynamically linking a program on an embedded platform includes: wherein the embedded platform includes a middle layer, the middle layer includes at least one class, each class is encapsulated from at least one function interface of an embedded operation system and corresponds to a virtual function table, and elements of the virtual function table respectively correspond to the at least one function interface of the embedded operation system, an application program to be linked includes at least one class, each class is encapsulated from at least one function interface of the application program and corresponds to the virtual function table, and elements of the virtual function table respectively correspond to the at least one function interface of the application program; the method includes:

compiling the application program into Position Independence Codes (PICs), wherein storage positions of different code sections in the PICs which are obtained by compiling different functions of the application program do not overlap with each other; copying all the PICs into a memory of the embedded operation system;

creating a class pointer, and transferring the class pointer between a class of a middle layer and the class of the application program to dynamically link the application program.

An embedded platform includes: a middle layer;

the middle layer comprises at least one class, each class is encapsulated from at least one function interface of an embedded operation system and corresponds to a virtual function table, and elements of the virtual function table respectively correspond to the at least one function interface; and the middle layer is configured to perform the above method.

As can be seen, the middle layer is encapsulated from the embedded operation system and includes one or more classes. Each class is encapsulated from multiple function interfaces of the embedded operation system and corresponds to a virtual function table. Elements of the virtual function table respectively correspond to the multiple function interfaces. The application program to be linked includes one or more classes, and each class is encapsulated from multiple function interfaces of the application program and corresponds to the virtual function table. Elements of the virtual function table respectively correspond to the multiple function interfaces of the application program. The application program is compiled into Position Independence Codes (PICs), the storage positions of different code sections in the PICs which are obtained by compiling different functions of the application program do not overlap with each other, so that the application program can be operated in any storage space, and functions of the application program can be invoked independently. All the PICs are copied into a memory of the embedded operation system; a class pointer is created, and the class pointer is transferred between the class of the middle layer and the class of the application program to dynamically link the application program.

Once the class pointer is created, function interfaces which correspond to the elements of the virtual function table corresponding to the class pointer are instantiated, i.e. the functions are given with actual addresses. At this time, functions corresponding to the classes of the middle layer and functions corresponding to the application program are dynamically linked through the virtual function table. And thus, by creating the class pointer and transferring the class pointer between the class of the middle layer and the class of the application program, the dynamic link of the application program can be implemented.

Since the dynamic link of the program is implemented by creating the class pointer and transferring the class pointer between the class of the middle layer and the class of the application program, when the file obtained by compiling the application program is loaded into the memory, it is not needed to extract information from the file to recalculate the positions of compiling codes in the memory, so as to decrease the time of implementing the dynamic link of the program and increase the speed of dynamically linking the program.

DETAILED DESCRIPTION OF THE INVENTION

In order to make the object, solutions and merits clearer, the present invention will be illustrated hereinafter in detail with reference to the accompanying drawings and examples.

Figure 1:
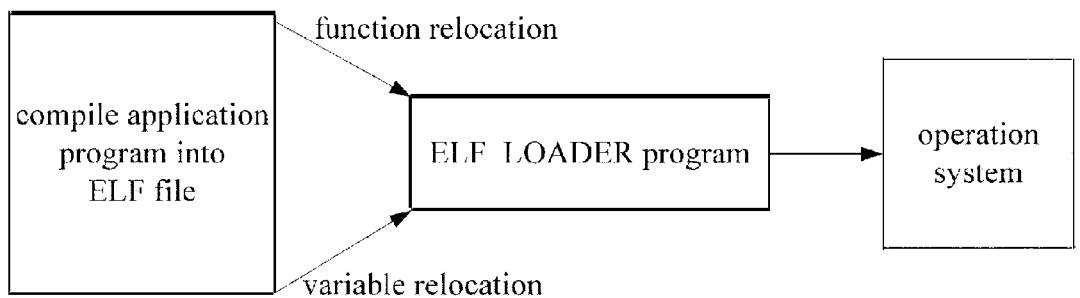
FIG. 1 is a schematic diagram of dynamically linking a program by using an ELF mode in the prior art.
Figure 2:
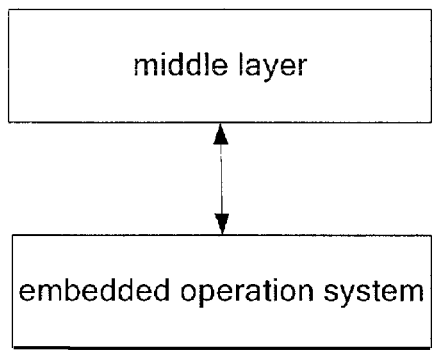
FIG. 2 is a schematic diagram illustrating the structure of an embedded platform according to an example of the present invention.

FIG. 2 is a schematic diagram illustrating the structure of an embedded platform according to an example of the present invention. As shown in FIG. 2, the embedded platform includes a middle layer.

In the example of the present invention, the middle layer is encapsulated from the embedded operation system and is composed of classes, each class corresponds to one virtual function table, and elements of the virtual function table respectively correspond to function interfaces of the embedded operation system.

When the middle layer is encapsulated from the embedded operation system, function interfaces which are often used by the application programs among all functions of the embedded operation system are encapsulated into the middle layer. The function interfaces with related effect are encapsulated into one class. For example, the interfaces of drawing functions, the interfaces of character editing functions, the interfaces of network connection functions and the interfaces of information transmission functions are encapsulated into the middle layer, and the interfaces of the drawing functions and the interfaces of the character editing functions are encapsulated into a document processing class, and the interfaces of the network connection functions and the interfaces of the information transmission functions are encapsulated into a network class. Each class is equivalent to a component, and thus the middle layer is actually composed of multiple components.

Figure 3:
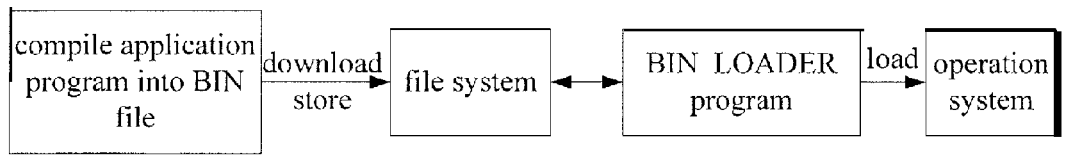
FIG. 3 is a schematic diagram of dynamically linking an application program on the embedded platform shown in FIG. 2.

FIG. 3 is a schematic diagram of dynamically linking an application program on the embedded platform shown in FIG. 2.

As shown in FIG. 3, the procedure of dynamically linking the application program includes: a phase of compiling and generating a BIN file, a phase of downloading and storing the BIN file, a phase of loading the BIN file and a phase of dynamically linking the application program.

The application program which is dynamically linked in the operation system shown in FIG. 2 is composed of one or more classes, each class is encapsulated from multiple function interfaces of the application program and corresponds to one virtual function table, and elements in the virtual function table respectively correspond to the multiple function interfaces of the application program. Similar to the class of the middle layer, functions corresponding to interfaces in the class of the application program are related with each other. In the application program, each class is equivalent to a component. Therefore, implementing the application program through the class is actually equivalent to dividing the application program into multiple components.

It should be described that, the following four problems need to be solved to dynamically link the program on the embedded platform: a function import problem, a function export problem, a sub-function invoking problem and a global variable location problem.

The function import problem refers to how to invoke a function of the embedded operation system through the middle layer by the application program to be dynamically linked; the function export problem refers to how to invokes a function of the application program through the middle layer by the embedded operation system; the sub-function invoking problem refers to how to invoke a sub-function of the application program by the application program or the middle layer; and the global variable location problem refers to, if the application program includes a global variable, how to relocate the global variable of the application program in the embedded platform after the application program is linked to the embedded platform.

The function import problem and the function export problem mainly relate to the phase of compiling and generating the BIN file and the phase of dynamically linking the program, and the sub-function invoking problem and the global variable location problem mainly relate to the phase of compiling and generating the BIN file.

Taking the four phases shown in FIG. 3 as an order, the method of dynamically linking the program on the embedded platform shown in FIG. 2 is described according to the characteristics of an embedded operation platform ARM.

1) The Phase of Compiling and Generating the BIN File

Firstly, a programmer writes an application program in a class form, and ensures that the application program is composed of classes, each class is encapsulated from one or more function interfaces of the application program and corresponds to one virtual function table, and elements of each virtual function table respectively correspond different function interfaces, which is equivalent to that the application program is divided into multiple components, and each component is compiled into one class.

Afterwards, the application program is complied into Position Independence Codes (PICs), and the PICs are generated in a form of a BIN file. The PICs refer to codes which can be operated in any storage space without depending on a specific storage position.

Specifically, when the application program is compiled by using an ARM ADS1.2 compiler, the codes of the application program may be compiled into the PICs through an acps/ropi compiling option, where the effect of the ropi option indicates that the positions of generated read-only codes are independent.

Since the application program is compiled into the PICs, in the phase of loading the BIN file, the BIN file may be loaded into any storage position of a memory of the embedded platform.

Since the application program is divided into multiple components and the middle layer is implemented through multiple components, the application program and the middle layer may implement the import and export of functions through the interaction between components or through the classes. It will be described in detail in the phase of dynamically linking the program how to implement the import and export of functions through the classes by the application program and the middle layer.

For the sub-function invoking problem, the functions of the application program may be operated independently with each other through compiling the functions of the application program into PICs in which functions are independent and the storage position of the code sections corresponding to different functions do not overlap with each other in the compiling and generating phase of the BIN file, so as to facilitate to invoke each function and not to influence other functions.

Specifically, when the application program is compiled by using the ARM ADS1.2 compiler, the functions of the application program are compiled into the PICs through a ZO compiling option, the PICs are independent and do not overlap with each other.

For example, suppose that there is an application program as following:

```
int appMain(Ishell*ptr,void**ppobj)
{
    fun1();
    return 0;
}
void fun1(void)
{
}
```

Suppose the function of appMain is always compiled at the initial address 0x00000000 of the BIN file and the application program is compiled through acps/ropi compiling option and ZO compiling option, compiling results are shown in Table 1.

TABLE 1

| function | address |
|---|---|
| appMain | PC + 0x00 |
| fun1 | PC + 0x0A |

In Table 1, PC is the initial address of the BIN file, and 0x0A represents an offset address of the function fun1.

As can be seen from Table 1, after the application program are compiled into PICs in which the functions are independent and the storage positions of code sections corresponding to different functions do not overlap with each other, the jump between the functions is relative jump, the position after the jump is determined by the shift address. In this way, each function of the application program can be invoked by the functions inside the application program and the functions outside the application program.

For the global variable location problem, two processing modes may be adopted. In one processing mode, the global variable is placed in the struct of the application program, and thus the global variable in the struct is also compiled into the PICs when the struct is compiled into the PICs. In the other processing mode, the global variable is compiled into the Position Independence Data (PID). In the former processing mode, multiple application programs can be loaded on the embedded platform shown in FIG. 2 at the same time; since the global variable is stored in the struct of the application program, it is needed to obtain the global variable from the struct when the global variable is used, and thus the operation is complex. In the latter processing mode, since the global variable is compiled into the PID, the global variable may be stored outside the struct, and generally stored following the storage space of the RAM in which the PICs are located, to avoid data cross-domain access.

When the application program is compiled by using the ARM ADS1.2 compiler, data sections of the application program is compiled into PID through an acps/rWpi compiling option. The PID refers to data sections which can be copied into any storage space of RAM and operated. Through the acps/rWpi compiling option, the data sections of the application program are compiled into the PID, and the PID is stored in a storage space [R9]+OFFSET. [R9] represents the value of a register R9, and OFFSET is the value of the offset address. In order to avoid the data cross-domain access, the value of the register R9 may be configured as a value which is equal to the initial address of BUFFER plus the size of the BIN file, i.e. the global variable is stored following the BIN file obtained by compiling the application program.

Since the register R9 is needed when the global variable is compiled into the PID, the application programs can only be loaded separately when the latter global variable location mode is adopted, i.e. it is impossible to load multiple application programs at the same time.

In addition, in the phase of compiling and generating the BIN file, it is needed to compile the principle function of the application program at the initial address of the BIN file, i.e. compile the entry point of the application program at the initial address of the BIN file, to ensure locating to each component of the application program when dynamically linking the program. Specifically, the entry point of the application program is configured as—first when the application program is compiled.

When the application program is compiled by using the ARM ADS1.2 compiler, the application program may be compiled into the BIN file through a thumb mode. The function address of codes generated through the thumb mode generally shifts for 32 bits (i.e. 4 bytes) compared with the function address of codes generated through the arm mode. When the embedded operation system invokes the application program through the middle layer for the first time, the entry point pointer of the application program points to the position of the initial address of the buffer in which the BIN file is located after shifting for 4 bytes and the application program is executed, e.g. if the initial address of the BIN file is 0x8000, the entry point pointer should point to 0x8004.

When the application program is compiled through the thumb mode, each instruction in the application program is compiled into 2 bytes (each instruction is compiled into 4 bytes if the application program is compiled through the arm mode), which can decrease the size of the BIN file, increase the operation speed of the application program and save power consumption.

To sum up, in the phase of compiling and generating the BIN file, the application program is compiled into the BIN file, the entry point of the application program is located in the initial address of the BIN file; the application program is compiled into the PICs, the storage spaces of the PICs which are obtained by compiling different functions of the application program do not overlap with each other; the global variable in the application program is compiled into the PID, or the global variable is stored in the struct of the application program.

2) The Phase of Downloading and Storing the BIN File

In the phase of downloading and storing the BIN file, the BIN file is copied into a file system directly.

3) The Phase of Loading the BIN File

When the BIN file is loaded, the BIN file is copied into the memory from the file system directly without needing to parse the BIN file or calculate according to the information in the BIN file.

4) The Phase of Dynamically Linking the Program

In the phase of dynamically linking the program, an actual class pointer is created, and the class pointer is transferred between the class of the middle layer and the class of the application program, to implement the import and export of the functions.

For the function import problem, by creating the class pointer of the middle layer, the application program makes the created class pointer point to the class of the middle layer in which the functions of the embedded operation system is located, instantiates corresponding functions through corresponding elements in the virtual function table corresponding to the class of the middle layer, to invoke the functions of the embedded operation system.

For example, the middle layer includes a class IFastString, the class IFastString contains a pointer of the virtual function table (pvt), and the virtual function table contains three sub-functions IFastString_Realase, IFastringString_GetLength and IfastString_Find.

Table 2 shows a schematic structure of the class IFastString.

TABLE 2

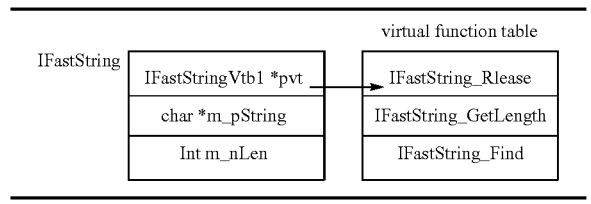

When the application program invokes the functions of the class IFastString, a class pointer FastString is created, and three members IFastString_Realase, IFastringString_GetLength and IfastString_Find in the virtual function table to which the class pointer points are given with actual function addresses. In this way, the application program may locate to three functions IFastString_Realase, IFastringString_GetLength and IfastString_Find in the embedded operation system.

Thus, when the application program invokes the functions of the embedded operation system, various classes pointers pointing to the classes in the middle layer are created through a management class e.g. a Shell class, the class is created according to the ID of the class in the middle layer, the function interfaces corresponding to the elements of the virtual function table in the class are instantiated, and the application program locates to the functions interfaces corresponding to the elements in the virtual function table to which the class pointer points through the created class pointer. The ID of the class in the middle layer is determined when the middle layer is compiled, and when the application program invokes the class of the middle layer, the application program transfers the ID of the class to be invoked to the management class, and the management class creates corresponding class pointer according to the ID of the class and transfers the class pointer to the application program.

Accordingly, the entry point of the application program may be represented in the following form:

```
int  appMain(Shell*ptr,void**ppobj)
{
return 0;
}
```

Through creating the class pointers and the classes, the application program makes the class pointer point to the virtual function table, i.e. point to the class of the middle layer, and invokes the function corresponding to function interface which corresponds to the element in the virtual function table.

For the function export problem, since the application program is compiled in a class form, i.e. the application program is composed of classes, each class corresponds to one virtual function table, and elements in the virtual function table respectively correspond to function interfaces. The application program instantiates the elements in the virtual function table corresponding to the class through creating the class pointer of the application program, and transfers the created class pointer to the middle layer to be stored. The middle layer directly invokes the function interface of the class of the application program when needing to invoke the functions of the application program, so as to implement the function export procedure.

For the function import procedure, the application program creates the class pointer pointing to the class of middle layer through the management class. For the function export procedure, each class of the application program is instantiated when the application program is compiled, so loading the BIN file generated by compiling the application program into the middle layer (i.e. loading the BIN file) is equivalent to copying the instantiated class of the application program into the middle layer directly; if the embedded operation system invokes the class of the application program, i.e. in order to implement function export, the class of the application program which is copied into the middle player is invoked directly.

Figure 4:
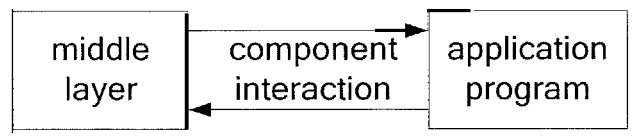
FIG. 4 is a schematic diagram illustrating the interaction between a middle layer and an application program according to an example of the present invention.

To sum up, in the present invention, the middle layer is encapsulated from the embedded operation system, and the application program is divided into multiple components through the classes, so as to implement interaction between the middle layer and the application program through the components, referring to FIG. 4.

FIG. 4 is a schematic diagram illustrating the interaction between the middle layer and the application program according to an example of the present invention.

In FIG. 4, when the application program needs to invoke the functions of the embedded operation system, the class pointer pointing to the class of the middle layer is created to implement component interaction; when needing to invoke the application program, the middle layer invokes the application program through the stored class pointer of the application program, and the class pointer of the application program is created by the application program itself and stored in the middle layer.

After the middle layer is encapsulated from the embedded operation system, since the interaction between the components of the middle layer and the components of the application program can be implemented through the classes, a corresponding application program can be developed on the middle layer.

Figure 5:
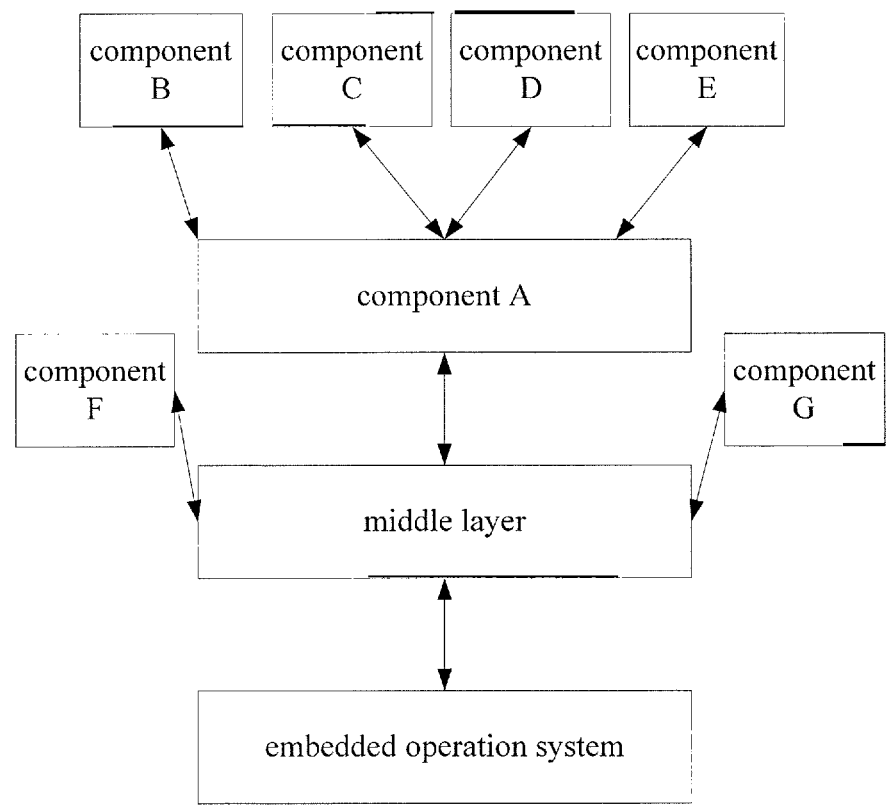
FIG. 5 shows a developing environment of dynamical application program in which an Instant Messenger is taken as a core.

FIG. 5 shows a developing environment of radio dynamical application program in which an Instant Messenger is taken as a core.

As shown in FIG. 5, the developing environment includes an embedded operation system, a dynamical application program middle platform (SDK) and a dynamical application program. The SDK is the above-mentioned middle layer encapsulated from the embedded operation system, and the dynamical application program is the above-mentioned application program compiled in the form of class.

The dynamical application program shown in FIG. 5 includes a component A for implementing an basic IM function, a component B for implementing an IM game, a component C for implementing an IM pet function, a component D for implementing an IM video function, a component E for implementing an IM music function and components F and G for implementing an extension application. The component A, component F and component G interacts with the middle layer through the classes, the components B to E are loaded and operated after the component A is loaded, that is to say, multiple components are operated at the same time, the components B to E may communicate with the classes of the component A through the classes of the components B to E, so as to implement a plug-in procedure of the application program.

In FIG. 5, the SDK and the embedded operation system are compiled and downloaded to a chip at the same time. The application program to be linked dynamically is written in a form of class for implementing specific application functions, and is compiled separately by using the method shown in FIG. 3, is downloaded to a file system of the chip, and is copied into a memory of the embedded operation system when needing to be loaded, and the SDK and the application program interact with each other through the class.

As can be seen from the above technical solutions, after the application program is compiled into the BIN file and downloaded, when the application program needs to be operated, it is only needed to directly copy the application program into the memory, and the subsequent function import and export problems are automatically implemented through creating actual class pointer and transferring the class pointer between the middle layer and the application program, without parsing or calculating the BIN file, so as to improve the speed of dynamically linking the program.

Moreover, the storage space occupied by the BIN file obtained by compiling the application program is one third of the storage space occupied by the ELF file obtained by compiling the application program, and thus the storage space can be saved if the application program is compiled into the BIN file.

In addition, the interaction between the middle layer and the application program is implemented through the class, and the interaction is based on components, so as to facilitate the component update of the application program, the component update of the middle layer, or the component synchronization update of the application program and the middle layer, even the components of the middle layer or the application program may be used to construct a new application, so as to implement the plug-in of the application program. Through constructing a proper application platform, the development of the application program may be simplified, which is benefit for the development of the application program of the operation system of a non-intelligent mobile telephone.

The foregoing are only preferred embodiments of the present invention and are not for use in limiting the protection scope of the present invention. Any modification, equivalent replacement and improvement made within the scope of the present invention should be covered under the protection scope of the present invention.

The invention claimed is:

1. A method of dynamically linking an application program on an embedded platform, wherein the embedded platform comprises a middle layer, the middle layer comprises at least one class, each class is encapsulated from at least one function interface of an embedded operation system and corresponds to a virtual function table, and elements of the virtual function table respectively correspond to the at least one function interface of the embedded operation system, an application program to be linked comprises at least one class, each class is encapsulated from at least one function interface of the application program and corresponds to the virtual function table, and elements of the virtual function table respectively correspond to the at least one function interface of the application program; the method comprises:

compiling the application program into Position Independence Codes (PICs), wherein storage positions of different code sections in the PICs which are obtained by compiling different functions of the application program do not overlap with each other;

copying all the PICs into a memory of the embedded operation system;

creating a class pointer, and transferring the class pointer between a class of a middle layer and the class of the application program to dynamically link the application program;

wherein the PICs are a binary BIN file; and the compiling comprises:

compiling the application program by using a thumb mode;

creating a class pointer, and transferring the class pointer between a class of a middle layer and the class of the application program to dynamically link the application program comprises:

when the embedded operation system invokes the application program through the middle layer for the first time, creating an entry point pointer of the application program which points to a position obtained by shifting an initial address of a buffer in which the BIN file of the application program is located for 4 bytes, and operating an entry point.

2. The method of claim 1, wherein the application program comprises a global variable, the method further comprises:

compiling the global variable of the application program into Position Independence Data (PID), and storing the PID following the PICs, to implement global variable relocation during a procedure of dynamically linking the application program.

3. The method of claim 1, wherein the application program comprises a global variable and a struct, the method further comprises:

storing the global variable of the application program into the struct of the application program;

compiling the application program into Position Independence Codes (PICs) comprises: compiling the struct into the PICs.

4. The method of claim 1, wherein compiling the application program into PICs, wherein storage positions of different code sections in the PICs which are obtained by compiling different functions of the application program do not overlap with each other comprises: compiling the application program by using ACPS/ROPI compiling option and ZO compiling option in an ARM ADS1.2 compiler of the embedded operation system.

5. The method of claim 2, wherein compiling the global variable of the application program into PID comprises: compiling the application program by using an ACPS/RWPI compiling option in a ARM ADS1.2 compiler of the embedded operation system.

6. The method of claim 1, wherein creating a class pointer, and transferring the class pointer between a class of a middle layer and the class of the application program comprises: creating, by the application program, a class pointer of the middle layer through a management class when invoking a function of the embedded operation system, wherein the class pointer points to the class of the middle layer; transferring the class pointer to the class of the application program; or creating, by the application program, a class pointer of the application program, instantiating the elements of the virtual function table corresponding to the class of the application program, and transferring the class pointer to the middle layer to be stored; when needing to invoke a function of the application program, invoking, by the middle layer, the class pointer of the application program which is stored by the middle layer.

7. A computer-implemented processor having an embedded platform, comprising a middle layer, wherein the middle layer comprises at least one class, each class is encapsulated from at least one function interface of an embedded operation system and corresponds to a virtual function table, and elements of the virtual function table respectively correspond to the at least one function interface; and the middle layer is configured to perform the method claimed in any of the above claims 1 to 6.

* * * * *